(12) United States Patent
Higgins

(10) Patent No.: US 11,033,017 B2
(45) Date of Patent: Jun. 15, 2021

(54) SNAKE TRAP

(71) Applicant: Kevin Higgins, Warwick, RI (US)

(72) Inventor: Kevin Higgins, Warwick, RI (US)

( * ) Notice: Subject to any disclaimer, the term of this patent is extended or adjusted under 35 U.S.C. 154(b) by 0 days.

(21) Appl. No.: 16/399,836

(22) Filed: Apr. 30, 2019

(65) Prior Publication Data
US 2020/0344994 A1  Nov. 5, 2020

(51) Int. Cl.
*A01M 23/08* (2006.01)
*A01M 23/20* (2006.01)
*A01K 63/00* (2017.01)

(52) U.S. Cl.
CPC .......... *A01M 23/08* (2013.01); *A01K 63/003* (2013.01); *A01M 23/20* (2013.01); *A01M 2200/00* (2013.01)

(58) Field of Classification Search
CPC ...... A01M 23/00; A01M 23/08; A01M 23/16; A01M 23/20; A01M 2200/00; A01K 63/00; A01K 63/003; A01K 63/006
See application file for complete search history.

(56) References Cited

U.S. PATENT DOCUMENTS

| | | | | |
|---|---|---|---|---|
| 4,234,780 A * | 11/1980 | McCarthy | ............ | A01K 63/065 119/174 |
| 4,926,581 A * | 5/1990 | Grivas | ................. | A01M 23/20 43/61 |
| 4,958,593 A * | 9/1990 | Hurlburt | .............. | A01K 63/003 119/246 |
| 5,682,705 A * | 11/1997 | Stahl | ..................... | A01M 23/08 43/61 |
| 5,713,304 A * | 2/1998 | de Vosjoli | ............ | A01K 63/003 119/266 |
| 5,778,594 A * | 7/1998 | Askins | .................. | A01M 23/20 119/474 |
| 5,842,439 A * | 12/1998 | Selstad | ................ | A01K 63/003 119/481 |
| 6,023,878 A * | 2/2000 | Fore | ....................... | A01M 23/08 43/61 |
| 6,327,997 B1 * | 12/2001 | Terry | ...................... | A01K 1/03 119/246 |
| 7,051,472 B1 * | 5/2006 | Kelly | .................... | A01M 1/023 43/58 |
| 2005/0235553 A1 * | 10/2005 | Rail | ....................... | A01M 23/38 43/58 |
| 2012/0153191 A1 * | 6/2012 | Kane | ..................... | A01K 1/034 250/504 R |
| 2018/0343838 A1 * | 12/2018 | Rodman | .............. | A01K 63/003 |
| 2019/0313627 A1 * | 10/2019 | Broskey | ................ | A01M 23/08 |

* cited by examiner

*Primary Examiner* — Christopher R Harmon

(57) ABSTRACT

A snake trap having three (3) doors, the top door for inspection, and two side doors to expose or seal trap openings for targeted and non-targeted animals to travel in and out of device, therein the cavity of the device a heating source and nesting area for the targeted animal.

18 Claims, 6 Drawing Sheets

US 11,033,017 B2

SNAKE TRAP

CROSS-REFERENCE TO RELATED APPLICATIONS

N/A

FEDERALLY SPONSORED RESEARCH

N/A

SEQUENCE LISTING OR PROGRAM

N/A

TECHNICAL FIELD OF THE INVENTION

The present invention relates to trapping snakes.

BACKGROUND OF THE INVENTION

Traps which exterminate snakes are well known in the art. Typically such a trap comprises a single opening with restraining mechanisms such as an adhesive, netting or pressure device preventing the snake from escaping. When such traps are placed in areas where other non-targeted species are present, the non-targeted species are trapped and exterminated as well.

The present invention of the snake trap addresses broadly a problem of capturing snakes without harm by pet owners and wildlife wardens.

In recent years, snakes from around the world have been turning up in U.S. wetland areas. For example, Burmese pythons, one of the largest snake species on earth, are now known to be breeding in the Florida Everglades and spreading rapidly throughout South Florida. Nearly 1,000 pythons have been removed from the Florida Everglades National Park and surrounding areas since 2002—likely representing only a fraction of the total population.

The presence of exotic snakes often results from their intentional release by pet owners. These snakes can have devastating consequences to the ecosystem. Burmese pythons feed on a wide variety of birds and mammals in the Everglades. By preying on native wildlife, and competing with other native predators, pythons are seriously impacting the natural order of south Florida's ecological communities. Their voracious appetite can further threaten many endangered species and move other species closer to endangered status. Further, the snakes are increasingly turning up in backyards and gardens of homes adjacent to wetland areas.

The invasive brown tree snake that was most likely inadvertently introduced into Guam probably from New Guinea after World War II via cargo shipments. Since its introduction, the brown tree snake has colonized the entire island of Guam, at densities of up to about 33 snakes per acre in Guam or approximately 1 to 2 million brown tree snakes inhabit the 200 square mile island of Guam. These venomous brown tree snakes have caused the extinction of most of Guam's native birds, bats, and lizards; also the brown tree snakes are feeding on young poultry and other small livestock; in addition to threatening human health and safety. Further, the brown tree snakes also cause electrical power outages throughout Guam via wiring damage causing millions of dollars in electrical infrastructure structural damages and lost revenue. The desire for practical technology to aerially deliver baits for brown tree snake control is widespread and has existed for decades. Interested parties include the United States Department of Defense, the United States Department of the Interior, the United States Fish and Wildlife Service, the United States Office of Insular Affairs, the United States Department of Agriculture, the Government of Guam, and others.

The need exists for a trapping system that can capture the snakes so that they can be further studied and/or eradicated. The current invention comprises a safe and efficient trap designed specifically for snakes. The design of the trap precludes the possibility of inadvertently trapping non-targeted animals by allowing animals to enter and exit the trap at will.

Typical snake traps are effective in exterminating snakes, not capturing live snakes. Snakes have inherent ability to avoid or escape from such traps. Snakes generally crawl with their head held slightly off the ground, using lateral movements of their body to push their head forward. A snake encountering a plate or tray trap might crawl around the trap, choosing the known of the surface it is crawling on to the unknown of the open trap surface. Even if the snake does proceed onto the tray or plate, it would likely only just barely touch the adhesive, netting or pressure device with its neck before sensing the adhesive, netting, or pressure device and stopping. The snake would then be able to use the entire rest of its body to thrash about and free itself from the glue, net, or pressure device or jerk its head back out of the glue, net or pressure device. The snake could use any rough surfaces around the trap to leverage its body and pull its neck free. If the snake only slightly contacts the adhesive of an open glue or adhesive, net, or pressure trap it can jerk its head up and to the side and go around the trap. Enclosed adhesive, net, or pressure traps generally do not have openings that are positioned and sized to be attractive to snakes, are not shaped and sized to capitalize on basic snake behaviors, and do not have means for preventing a snake's escape should a snake enter and contact the adhesive, net, or pressure device.

SUMMARY OF THE PRESENT INVENTION

The present invention in one embodiment thereof, comprises an apparatus for trapping a snake comprising a base wall, a first and a second side walls, a third and a fourth walls having a semi-oval openings, and a top wall attached to said first wall lateral edge defining an interior rectangular box therein having a fifth and a six walls attached to opposing edges of said first and second walls enclosing the box, within the interior of said box lies an elevated heating source and a nesting area attracting the snake to enter either side of the semi-oval openings having sufficient height and width to allow substantially an entire body of the snake to enter and nest within the interior cavity of the box, the wall's exterior having color variations of white and black compensating for ambient temperatures, and the top, fifth and sixth walls having an opening and closure mechanism trapping the snake within the box.

DESCRIPTION OF THE PRIOR ART

The following relevant art has dealt with the field of trapping snakes in general, but has not provided solutions for releasing unharmed non-targeted species.

Known prior art, such as U.S. Pat. No. 10,024,077 issued to Witherspoon et al. on Jul. 17, 2018, refers to a low-profile snake barrier includes a plurality of sections that form a boundary. One section of the plurality of sections includes a screen-type material that is supported by a first support brace at a first end of the one section and a second support brace at a second end of the one section opposite the first end. The support braces support the screen-type material in a collapsed configuration and an erect configuration, where the erect configuration includes an upright portion of the screen-type material extending upward from the ground and an overhang portion of the screen-type material extending from the upright portion. In the collapsed configuration, the upright portion and the overhang portion are parallel to the ground. Each support brace include pivotably coupled members.

Another prior art, such as U.S. Pat. No. 9,730,438 issued to Messaros et al. on Aug. 15, 2017 refers to a container apparatus for exposing an article to an external environment, the apparatus including a sidewall with an interior having an inner surface, the sidewall terminating in a first margin and an opposing second margin. The container apparatus also includes a capsule having an outer periphery and an inner void holding the article, the outer periphery is slidably engaged to the sidewall inner surface, the capsule having a split boundary separating the capsule into a plurality of partial capsule elements. The capsule having a closed state with the partial capsule elements being adjacent at the boundary while slidably engaged to the sidewall with the void separated from the environment and the capsule being able to have an open state without the slidable engagement as the partial capsule elements are separated at the boundary with the void open to the environment, thus exposing the article to the environment.

Other prior art, such as U.S. Pat. No. 8,407,931 issued to Humphrey on Apr. 2, 2013 refers to a snake trap primarily designed to capture relatively long and heavy snakes such as the Burmese Python. The trap is specifically configured to avoid inadvertently capturing non-targeted animals by using at least two weight/pressure-sensing plates. Each pressure plate has an independent release mechanism so that both pressure plates must be in a depressed position to spring the trap.

U.S. Pat. No. 7,726,063 issued to Hawkins on Jun. 1, 2010 refers to an apparatus for trapping a snake comprising a base wall having a smooth interior surface and an exterior surface, first and second side walls having a smooth interior surface and an exterior surface and having first edges attached to opposing edges of said base wall, a top wall having a smooth interior surface and an exterior surface and having opposing edges attached to second edges of said first and second side walls, wherein said first and second side walls, said base wall and said top wall define a tunnel therein, the tunnel including a first area for placing a sticky pad for trapping the snake coming into contact with the sticky pad and at least one second area through which the snake must pass before reaching the first area, the second area having a smooth inner surface for denying traction to the snake trapped on the sticky pad and having a sufficient length and width to allow substantially an entire body of the snake to enter the tunnel prior to encountering the sticky pad.

U.S. Pat. No. 6,023,878 issued to Fore on Feb. 15, 2000 refers to a snake trap including a trap housing defining a trap compartment accessible through a snake entrance opening; an elongated tubular snake entrance tube positioned within the trap compartment having an inlet opening positioned adjacent to the snake entrance opening; and a sliding trap door slidable into a closed position between the snake entrance opening and the inlet end of the elongated snake entrance tube by a triggerable trap door closure mechanism positioned within the trap compartment.

U.S. Pat. No. 6,009,661 issued to Lloyd on Jan. 4, 2000 refers to a snake trap is disclosed in which a trigger activated door (4) closes in response to a horizontal force being applied to the trigger (7) which is pushed against by the snake as it moves within the trap.

U.S. Pat. No. 5,813,165 issued to Dougherty, Sr. on Sep. 29, 1998 refers to a biodegradable snake trap 10 suitable for deployment from an aircraft is disclosed, comprising a hook 12 with line 14 attached, embedded in an egg 16. The egg 16 is encased in a frozen fluid 20 and disposed within container 18, to protect the egg 16. The snake trap 10 is dropped from an aircraft flying over the area in which the trap is to be deployed. A grapple 24 hooks onto tree limbs to prevent the snake trap from falling to the ground, and descent restrictor 26 slows the rate of descent of the trap. When the frozen fluid 20 melts, the container 18 falls away and exposes the egg 16, attracting snakes. When a snake swallows and crushes the egg 16, the hook 12 lodges in the snake's vital organs and kills the snake.

U.S. Pat. No. 5,497,576 issued to Nowak on Mar. 12, 1996 refers to an adhesive trap for capturing snakes. The trap includes a flat base and means for securing the base into position against a wall. A specially shaped non-adhesive crawling surface is adjacent the wall, and permits a snake to crawl onto the trap without encountering any adhesive. The crawling surface diminishes in width from its entry end to its terminal end, and is surrounded along its outer boundary by an adhesive capture area. The capture area includes a high-strength adhesive, such as that used in rodent glue traps. The adhesive-free crawling surface narrows sufficiently near its terminal end to cause a snake to throw a loop of its body laterally into the adhesive, either in the process of crawling forward, or when the snake attempts to turn around or pull back from the adhesive at the end of the crawling surface. The snake will be securely trapped when it pushes its chin down into the adhesive in an attempt to free its neck or throws a loop of its body laterally onto the adhesive area.

U.S. Pat. No. 4,489,516 issued to Moorhead on Dec. 25, 1984 refers to a device for the trapping of snakes and similar animals having an area of netting to be placed on the ground and releasably secured thereto and shaped such that a plurality of areas of the netting are substantially non-horizontal to the ground. A snake attempting to traverse the area of netting will pass into an interstice of the area of netting until its body size prevents forward motion. The scales of the snake will engage the strands of the netting preventing the snake from retreating from the netting and thus effectively trapping the snake.

U.S. Pat. No. 4,449,316 issued to Moorhead on May 22, 1984 refers to a device for the trapping of snakes and similar animals having a sheet of netting to be placed on the ground shaped so that a plurality of areas of the netting are substantially non-horizontal to the ground. A snake attempting to traverse the sheet will pass into an interstices until its body size prevents forward motion. The scales of the snake will catch on the strands of the netting preventing the snake from retreating from the netting.

U.S. Pat. No. 4,370,823 issued to Moorhead on Feb. 1, 1983 refers to a device for the trapping of snakes and similar animals having a sheet of netting to be placed on the ground shaped so that a plurality of areas of the netting are substantially non-horizontal to the ground. A snake attempting to traverse the sheet will pass into an interstices until its body size prevents forward motion. The scales of the snake will catch on the strands of the netting preventing the snake from retreating from the netting.

U.S. Pat. No. 4,286,405 issued to Howard on Sep. 1, 1981 refers to an elongated cage is selective in entrapping only pit vipers, the cage being open at one end to provide ingress for the triangular-shaped head of a pit viper, the other end of the cage being closed to prevent egress. A noose is placed at the open end, the noose allowing the snake to insert its head therethrough but constricting the neck at the junction of the neck and the head as the snake attempts to withdraw its head and the base of the triangular head abuts the nether side of the noose. A stake and tether anchor the cage which is customarily located in paths believed to be frequented by snakes. Rodent odor is sometimes used to enhance the trap's capabilities.

However, the prior art do not disclose a heating source, surface paint for temperature control, or a means of escape for non-targeted endangered species, a locating device, and an energy source for maintaining the heating source.

DETAILED DESCRIPTION

Figure 1:
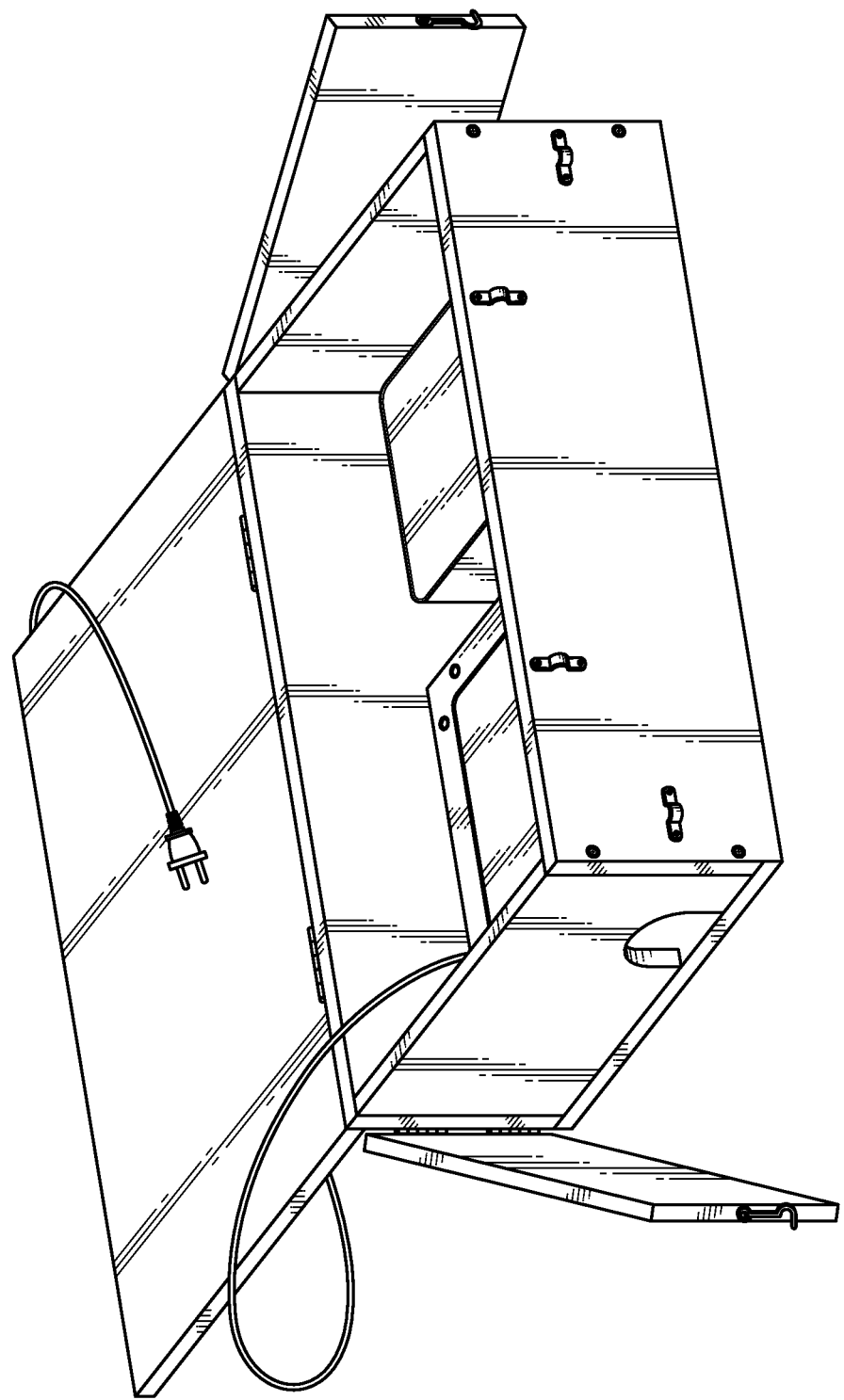
FIG. 1 displays a lateral front view of the second side wall in the forefront adjacent to the third side wall with a semi-oval opening attached to the base wall forming an interior cavity housing a power source connected to a partially open fifth wall.
Figure 2:
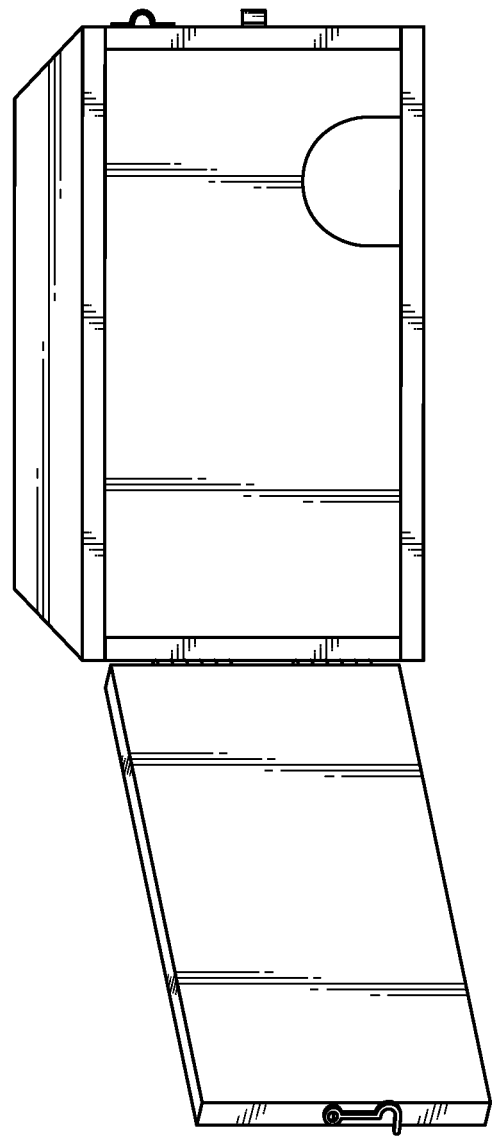
FIG. 2 displays a frontal view of the third side wall with a semi-oval opening adjacent to an open fifth wall.
Figure 3:
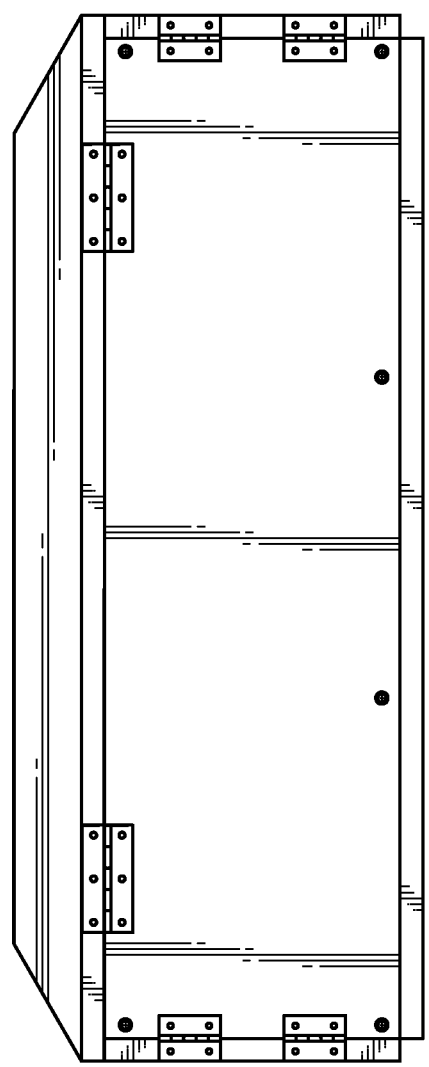
FIG. 3 displays a lateral view of the first side wall attached to the top wall with an opening mechanism and the bottom wall, and the fifth and sixth side walls attached to the third side wall with an opening mechanism.
Figure 4:
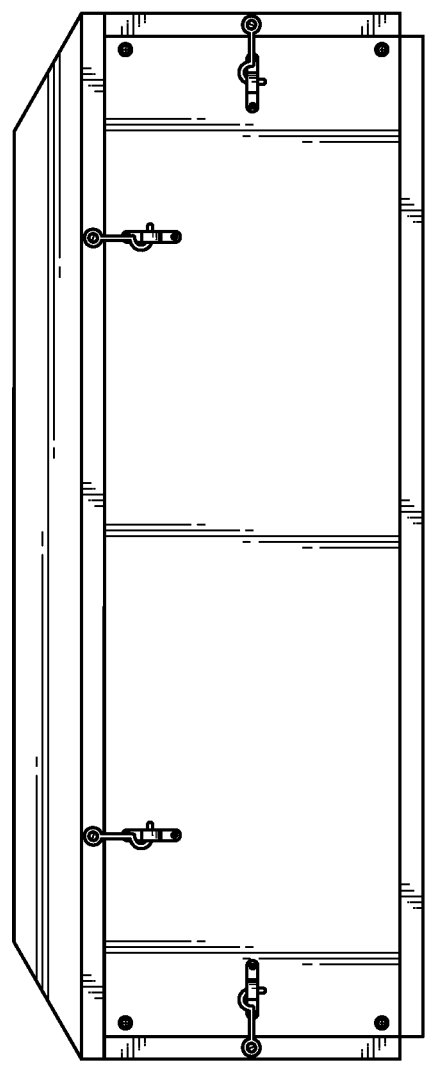
FIG. 4 displays a lateral view of the second side wall attached to the top wall with a closing mechanism and the bottom wall, and the fifth and sixth side walls attached to the second side wall with a closing mechanism.
Figure 5:
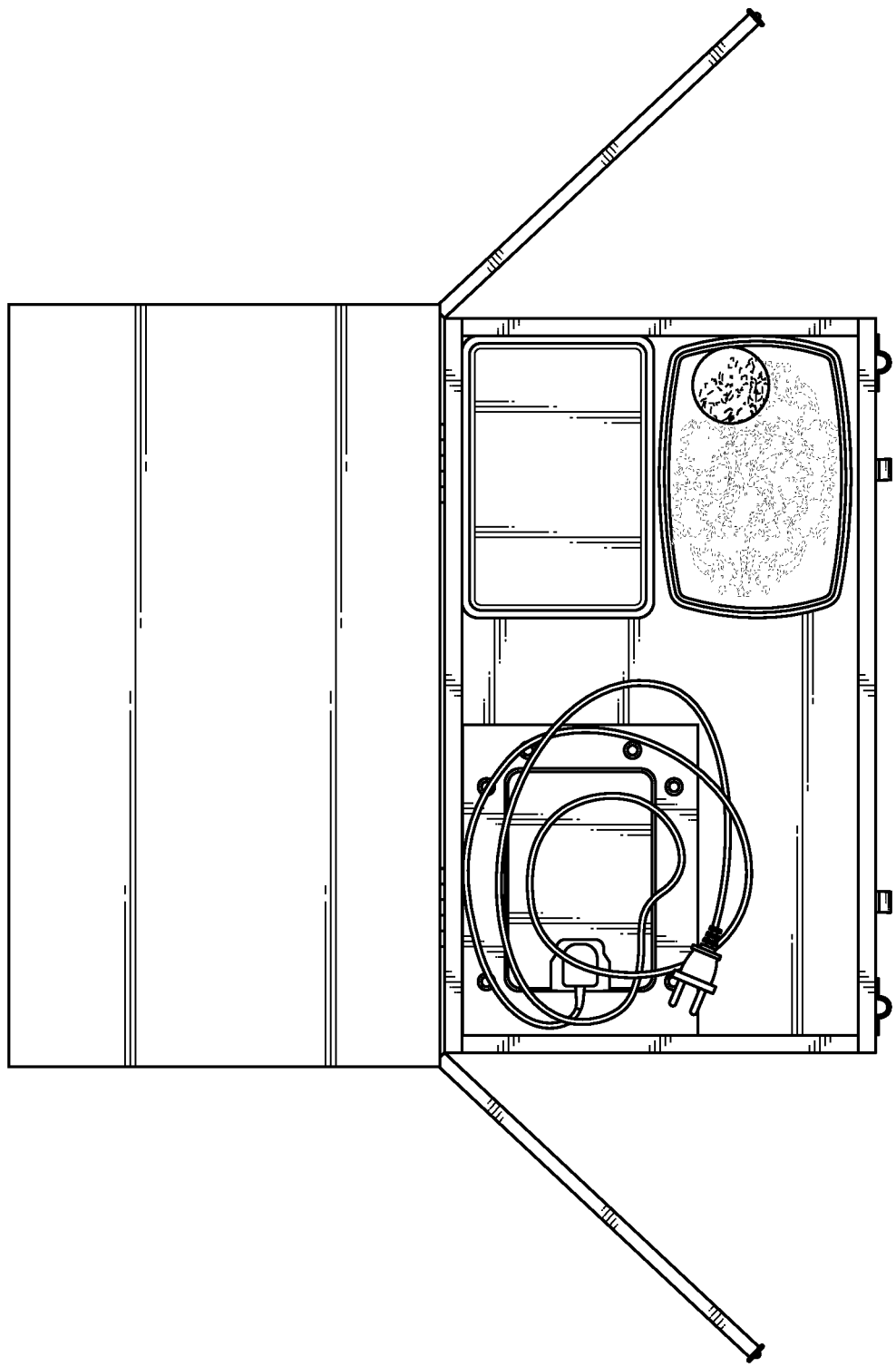
FIG. 5 displays a bird eyes view of the interior cavity of the base wall with an elevated heating source and removal nesting container with an opening inside the first and second side walls and third and fourth side walls adjacent to partially opened fifth and sixth wall connected to the first side wall with the top wall in a fully open position.
Figure 6:
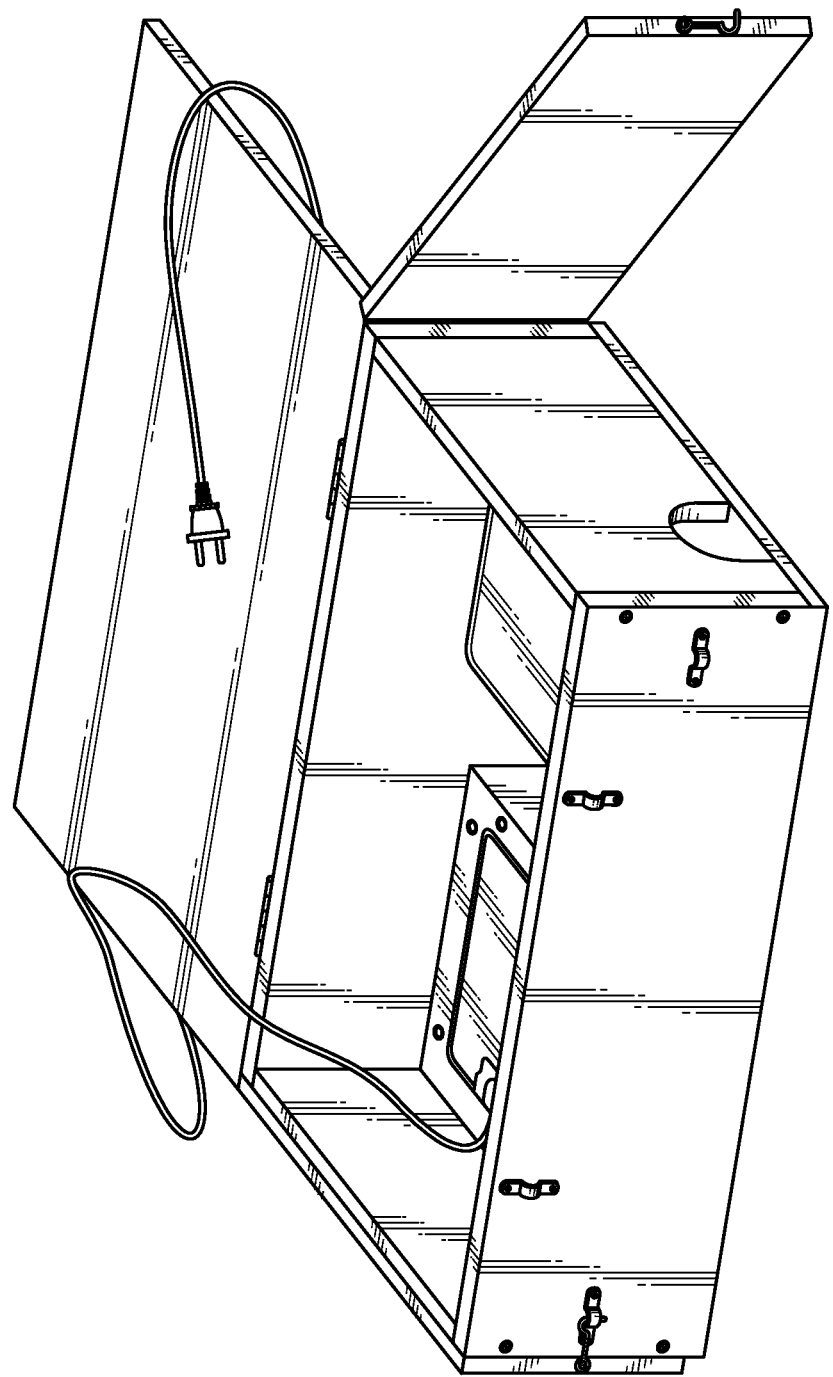
FIG. 6 displays a lateral rear view of the first side wall adjacent to the fourth side wall with a semi-oval opening attached to the base wall forming an interior cavity housing a power source and nesting area adjacent to a partially open sixth wall.

The present invention is a device for trapping snakes having three doors, the top door for inspection and animal removal, the two side doors to expose or seal trap openings designed for animals to travel in and out of device and side doors corral the snake toward the openings, inside the device is a hide.

The doors are either a hinged door or a guillotine-style door.

The door traps are manually operated.

The hides inside the device are one at ambient temperature and the other is heated with a heating source.

The hides are sized sufficiently to accommodate the length and width of a snake to access entry and exit ways of trap and hide.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention described in the following claims.

What is claimed is:

1. A device for trapping a snake comprising:
a base wall, first and second side walls, a top wall, a third and fourth edge side walls having a semi oval opening, a fifth and sixth enclosure walls are parallel and movable to said third and fourth side walls;
wherein said base wall, the first and second side walls, and the third and fourth edge side walls define an interior cavity therein,
wherein the exterior surface of the device comprises a reflective coat for controlling temperature within the cavity;
the cavity having a hide with a heating source attached to the base wall;
a hide at ambient temperature without a heating source attached to the base wall;
wherein the cavity is equipped with a nesting area;
the fifth and sixth walls serving as a corral attracting the snake when moved to an open position.

2. The device as further defined in claim 1, wherein the reflective coat having gradation.

3. The device as defined in claim 1, wherein the reflective coat further comprising a darkened coat.

4. The device as defined in claim 1, wherein the reflective coat further comprising a lightened coat.

5. The device of claim 1, wherein the exterior surface of the top wall having solar panels.

6. The device of claim 1, wherein the base, the first and second side walls, the top wall, the third and fourth walls, and fifth and sixth enclosure walls are made of a water resistant material.

7. The device of claim 1, wherein the heating source connected to a power source.

8. The device of claim 6, wherein the power source comprising of an electrical outlet.

9. The device of claim 6, wherein the power source comprising of a battery.

10. The device of claim 6, wherein the power source comprising of the solar panels.

11. The device of claim 1, wherein the heating source attached to an elevated platform.

12. The device of claim 1, wherein the nesting area is removable.

13. The device of claim 1, further comprising semi oval openings allowing an entire body of the snake to enter and exit the interior cavity.

14. The device of claim 1, wherein the base wall, first and second side walls, the third and fourth edge side walls, and fifth and sixth enclosure walls accommodate an entire body of the snake to nest within the interior cavity.

15. The device of claim 1, wherein the top wall having a closure mechanism.

16. The device of claim 1, wherein the fifth and sixth side walls having a closure mechanism.

17. The device of claim 16, the closure mechanism comprising of either a hinged door or a guillotine sliding door.

18. The device of claim 1 further comprising a locating mechanism.

* * * * *